(12) United States Patent
O'Donnell

(10) Patent No.: US 8,248,405 B1
(45) Date of Patent: Aug. 21, 2012

(54) IMAGE COMPOSITING WITH RAY TRACING

(75) Inventor: Daniel O'Donnell, Port Townsend, WA (US)

(73) Assignee: Adobe Systems Incorporated, San Jose, CA (US)

( * ) Notice: Subject to any disclaimer, the term of this patent is extended or adjusted under 35 U.S.C. 154(b) by 710 days.

(21) Appl. No.: 12/393,752

(22) Filed: Feb. 26, 2009

(51) Int. Cl.
*G06T 15/00* (2011.01)
*G06T 17/00* (2006.01)
*G06T 15/50* (2011.01)

(52) U.S. Cl. .................. 345/419; 345/424; 345/426

(58) Field of Classification Search .................. None
See application file for complete search history.

(56) References Cited

U.S. PATENT DOCUMENTS 7,012,604 B1 * 3/2006 Christie et al. ............... 345/426
7,439,973 B2 10/2008 Fossum et al.
2007/0182732 A1 * 8/2007 Woop et al. .................. 345/420
2007/0206008 A1 * 9/2007 Kaufman et al. ............. 345/424
2009/0128562 A1 * 5/2009 McCombe et al. ........... 345/427
2010/0073369 A1 * 3/2010 McCombe et al. ........... 345/426
2010/0073370 A1 * 3/2010 McCombe et al. ........... 345/426

OTHER PUBLICATIONS

Pomi, Andreas and Philipp Slusallek. *Interactive Mixed Reality Rendering in a Distributed Ray Tracing Framework*. Computer Graphics Group, Saarland University, Germany. Mar. 2004. 3 pages.

* cited by examiner

*Primary Examiner* — Hau Nguyen
*Assistant Examiner* — Leon T Cain, II
(74) *Attorney, Agent, or Firm* — Fish & Richardson P.C.

(57) ABSTRACT

A computer-implemented method includes identifying an intersection point on a first graphical object from an incident ray. The incident ray originates from an image viewpoint. The method also includes directing a compositing ray from the image viewpoint to the intersection point. Further, the method includes determining color information associated with the intersection point from color information provided by the compositing ray.

28 Claims, 7 Drawing Sheets

IMAGE COMPOSITING WITH RAY TRACING

BACKGROUND

The present disclosure relates to rendering images by compositing color information provided from ray tracing techniques.

By compositing multiple two dimensional images, visual elements within each image may be combined for presentation in a single image. To produce such an image, the two dimensional images may be sorted and stacked prior to compositing color information (e.g., red green blue (RGB) color model, alpha channel, etc.) such that the desired colors and imagery is produced. Once sorted and stacked, various compositing algorithms such as the painter's algorithm may be implemented to combine the visual objects and colors from each scene. Such sorting and stacking techniques are not applicable for rendering images from three-dimensional graphical objects. Due to the three-dimensional geometries, the surfaces of the objects and lighting applied to the scene, three-dimensional processing techniques such as ray tracing are often implemented.

SUMMARY

This specification describes technologies relating to compositing color information by using ray tracing techniques and methodologies.

In general, one aspect of the subject matter described in this specification can be embodied in a computer-implemented method that includes identifying a intersection point on a first graphical object from an incident ray. The incident ray originates from an image viewpoint. The method also includes directing a compositing ray from the image viewpoint to the intersection point. Further, the method includes determining color information associated with the intersection point from color information provided by the compositing ray.

These and other implementation can optionally include one or more of the following features. Determining the color information associated with the intersection point may include compositing the color information from the compositing ray and color information associated with a reflected ray, the surface of the first graphical object, a transmission ray, and light parameter from a light source, individually or in combination. Color information associated with a second graphical object may be disregarded to determine the color associated with the intersection point. In some arrangements, the second graphical object is the first graphical object. The second graphical object and the first graphical object may share a common identifier. The image viewpoint may include a pixel of an image plane.

In general, another aspect of the subject matter described in this specification can be embodied in a system that includes a computer system, which includes a memory for storing graphical objects. The computer system also includes a ray tracer for identifying an intersection point on a first graphical object from an incident ray. The incident ray originates from an image viewpoint. The ray tracer is configured to direct a compositing ray from the image viewpoint to the intersection point. The ray tracer is further configured to determine color information associated with the intersection point from color information provided by the compositing ray.

These and other implementation can optionally include one or more of the following features. Determining the color information associated with the intersection point may include compositing the color information from the compositing ray and color information associated with a reflected ray, the surface of the first graphical object, a transmission ray, and light parameter from a light source, individually or in combination. Color information associated with a second graphical object may be disregarded to determine the color associated with the intersection point. In some arrangements, the second graphical object is the first graphical object. The second graphical object and the first graphical object may share a common identifier. The image viewpoint may include a pixel of an image plane.

In general, another aspect of the subject matter described in the specification can be embodied in a computer program product, encoded on a computer-readable medium, operable to cause data processing apparatus to perform operations that include identifying a intersection point on a first graphical object from an incident ray. The incident ray originates from an image viewpoint. The method also includes directing a compositing ray from the image viewpoint to the intersection point. Further, the method includes determining color information associated with the intersection point from color information provided by the compositing ray.

These and other implementation can optionally include one or more of the following features. Determining the color information associated with the intersection point may include compositing the color information from the compositing ray and color information associated with a reflected ray, the surface of the first graphical object, a transmission ray, and light parameter from a light source, individually or in combination. Color information associated with a second graphical object may be disregarded to determine the color associated with the intersection point. In some arrangements, the second graphical object is the first graphical object. The second graphical object and the first graphical object may share a common identifier. The image viewpoint may include a pixel of an image plane.

In general, another aspect of the subject matter described in the specification can be embodied in a method that includes executing instructions on a computing platform so that digital electronics signals representing an intersection point on a first graphical object are identified from an incident ray. The incident ray originates from an image viewpoint. The method also includes executing instructions on the computing platform so that digital electronics signals representing a compositing ray are directed from the image viewpoint to the intersection point. The method also includes executing instructions on the computing platform so that digital electronics signals representing color information associated with the intersection point are determined from color information provided by the compositing ray.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
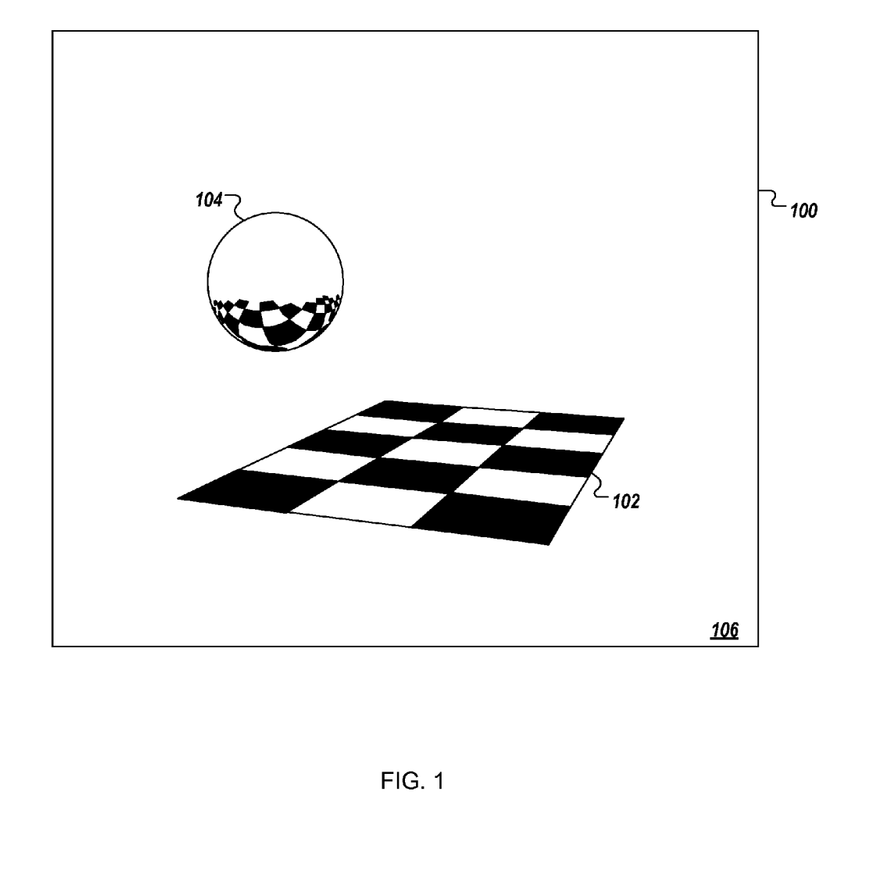
FIG. 1 illustrates an exemplary image display.

Referring to FIG. 1, an exemplary image 100 may be presented by various types of devices, for example, the output of a computer monitor or other similar equipment. Along with being represented as single still image (as illustrated), the image 100 may be included in series of images (e.g., a video recording, etc.) or other similar types of image representations. To produce the image 100, one or more image processing and production methodologies and techniques may be implemented. For example, the image 100 may be rendered by using techniques that implement ray tracing and compositing rendering results.

As can be imagined, any number and type of object may be represented in the image 100. For example, the image 100 may provide a two-dimensional representation of a particular visual perspective of three-dimensional graphical objects. For demonstrative purposes, a plane 102, a sphere 104 and a background 106 are illustrated in the image 100. In this example, the surface of the plane 102 has a checkerboard pattern of alternating colors (e.g., red and black) and the plane is partially transparent and reflective. Along with color, other visual properties may also be represented by the plane 102, for example, surface texture (e.g., a bumpy surface), brightness, shadows, luminosity, and the like. The surface of the sphere 104, in this example, is non-transparent and has a substantially mirror-like reflective property. As such, the surface of the lower hemisphere of the sphere 104 reflects the checkerboard pattern of the plane 102.

Along with being reflective, the surface of the plane 102 is capable of blending (compositing) with other features and objects represented in the image 100. For example, compositing the plane 102 and the background 106 may alter the colors of the plane's surface (e.g., the red and black checkerboard pattern becomes blue and green). Due to such compositing, the color of the plane's surface may change, however, the color of the plane's surface being reflected by the sphere may remain unchanged As such, the reflected image provided by the sphere 104 may not match the reflected object and provide an inaccurate representation (e.g., the composite colors of the checkerboard pattern of the plane 102). Such misrepresentations can propagate throughout an image. For example, the reflection of the plane 102 provided by the sphere 104 may be cast onto other reflective surfaces, thereby causing additional inaccurate representations of the plane. However, by collecting information associated with reflections, appropriate colors can be correspondingly provided to reflective surfaces.

Figure 2:
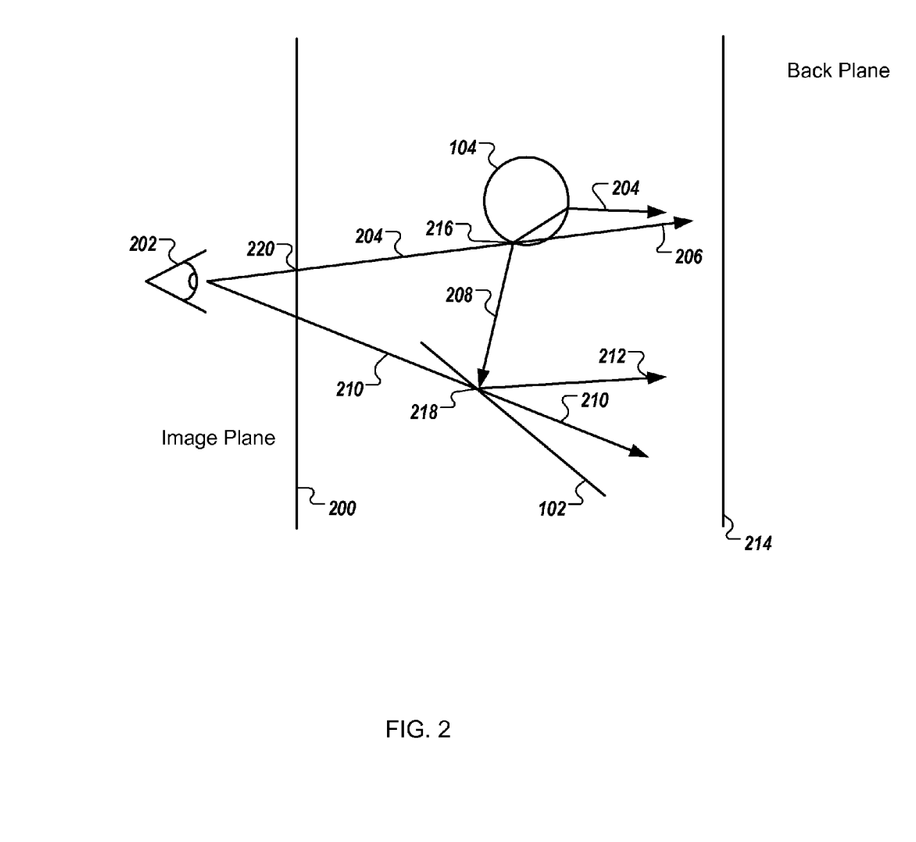
FIG. 2 illustrates objects represented in the exemplary image of FIG. 1.

Referring to FIG. 2, a perspective view of the three-dimensional objects represented in the image 100 is shown. A viewer's perspective of the image 100 is represented by an eye 202. For example, the eye 202 may represent the view of a viewer, the field of view of a virtual camera or other type of defined perspective. An image plane 200 defines the frame of the image 100 and is positioned between the eye 202 and the objects that appear in the image. In many ways, the image plane 200 can be considered as a display screen (e.g., a screen of a computer monitor) that presents the perspective of the image 100 as defined by the eye 202. Along with defining the image frame, the rectangular shaped image plane 200 includes pixels that may each be assigned a value that corresponds to a particular color to produce an image (e.g., the image 100) as defined by the perspective of the image plane.

Various techniques and methodologies may be implemented to identify the individual pixel values, for example ray tracing techniques may be used to produce the image 100 by tracing a path of light through each pixel of the image plane 200. To illustrate, a ray 204 (referred to as a view ray) propagates from the eye 202 through a particular portion of the image plane 200 that represents a pixel (e.g., of a computer monitor display). Correspondingly, similar view rays may be propagated from the eye 202 for other pixels of the image plane 200. For example, a 600*800 resolution display corresponds to 480,000 pixels and propagating an equivalent number of view rays into the scene.

Upon being cast through a pixel, the view ray returns information associated with a pixel value, based upon interactions experienced by the propagating view ray. For example, upon striking an object within the scene (e.g., the sphere 104) information representative of the color of the intersection point is provided for use by the appropriate pixel (from which the view ray was cast) of the image plane 100. Visual properties of the intersection point's surface may cause additional rays to be produced, which may factor into the returned color information. For example, refection and transmission rays may be produced at the intersection point that may propagate from the intersection point and return color information based upon intersecting with other surfaces. For example, as illustrated in FIG. 1, upon striking a reflective surface of the sphere 104, a reflective ray may be produced and cast toward the plane 102. Upon striking the plane, a color information may be returned to the intersection point on the sphere (and corresponding back to the pixel of the image plane 100), such that intersection point on the plane 102 appears to reflect on the surface of the sphere 104. As shown, by casting a multitude of rays, the checkerboard pattern of the plane 102 is reflected in the lower hemisphere of the sphere 104.

Objects such as the plane 102 are often associated with one compositing mode that defines a methodology (e.g., a mathematical function) for blending the background or other graphical objects, and the object. For example, a compositing mode of the plane 102 may define the blending of the colors of the plane's checkerboard surface to the color of the background 106. Such color blending may cause the colors of the checkerboard surface to change, for example, from red and black to green and blue. However, cast rays that impinge the plane 102 may return color information that is absent the actual composite color of the surface. For example, a ray reflected from the reflective sphere 104 may return the actual color of the plane 102 (e.g., red and black) and not the composite color (e.g., green and blue) that accounts for the blending of the color of the background 106. As such, the original color (e.g., red and black) of the plane's checkerboard pattern may be reflected in the sphere 104 while the plane itself appears with the composite color (e.g., green and blue) as provided by the compositing mode of the plane. Thus, such contrasting colors may confuse a viewer and diminish the artistic effect of the imagery. In some arrangements, graphical objects may be associated with different compositing modes or different types of compositing modes.

To assure that the appropriate composite color information is determined for each ray (e.g., a view ray, a reflective ray, transmission ray, etc.) incident at each intersection point (e.g., for being passed back by the incident ray), one or more techniques and methodologies may be implemented. For example, a ray (referred to as a compositing ray) may be cast from a viewpoint (e.g., provided by the eye 202) through the intersection point to collect color information (e.g., from the background) to composite with the color of the surface and other color information (e.g., color information provided by reflective rays, transmission rays, light rays, etc.) associated with the intersection point. By using the color information provided by the compositing ray, the composite color of each intersection point may be calculated and returned by the incident ray. As such, the composite color (e.g., blue and green) of the checkerboard surface 102 is provided by the reflective ray and the composite color is reflected by the reflective surface of the sphere 104.

To illustrate, as shown in FIG. 2, the view ray 204 cast from the eye 202, can intersect with the image plane 200 and propagate into the scene of graphical objects. The intersection on the image plane 200 can be used to determine the location upon which the view ray 204 information is displayed on the image 100 (e.g., identify the appropriate pixel). In particular, upon entering the scene, the view ray 204 interacts with the graphical objects and returns information that corresponds to a pixel value. In general, incident view rays may reflect off graphical objects (with reflective surfaces), transmit through objects (with refractive properties), etc. As such, if a view ray intersects with an object in the scene, additional rays can be created at the point of intersection and cast to collect information associated with the intersection point. One type of ray that can be potentially created is a reflective ray and may provide information (e.g., color information) associated with imagery reflected upon the intersection point of the object. A transmission ray may also be potentially created at an intersection point. Similar to the reflective ray, transmission rays may provide color information associated with the intersection point. However, rather than reflecting, the transmission ray provides color information by transmitting through the intersection point and intersecting with another surface (e.g., another object's surface, the background, etc.). Other sources may provide color information associated with an intersection point, for example, one or more light sources may provide information associated with light intensity, shadowing and shade. A compositing ray can gather color information associated with objects behind the point of intersection from the point of view of the eye 202. From this color information, a composite color may be calculated, assigned to the intersection point and returned along the path of the incident ray (e.g., an incident view ray). For example, compositing may be determined as a function of surface colors (e.g., the red and black color of the plane 102), colors from rays reflected from the intersection point, colors from rays transmitted through the intersection point, lighting properties provided by a light ray, and colors (e.g., background colors) provided by a compositing ray. In some implementations, surface colors, colors provided by reflective and transmission rays, and lighting information may be first processed to produce a composite color (referred to as a shaded color). Next, color information from the compositing ray is blended with the shaded color. Other techniques may be implemented to combine the color information. Further, additional color information may be provided by casting multiple view rays for one or more pixels. For example, multiple view rays may be cast for each pixel of the image plane 200 and the color information returned (by each respective view ray) may be processed (e.g., averaged, etc.) to determine a corresponding pixel value. By casting and using multiple view rays, graphical artifacts (e.g., jagged edges) may be reduced. One or more colors may be represented in the returned color information, for example, the composite color may be determined at an intersection point and returned. Alternatively, the individual colors (referred to as a shade tree) or processed colors (e.g., a shaded color) may be returned to the image plane prior to compositing into a composite color (e.g., to allow color adjustments prior to producing a composite color). Other compositing techniques and methodologies may also be implemented.

As rays (e.g., view rays, reflective rays, transmission rays, etc.) propagate though the scene and intersect with additional surfaces, color compositing can be considered an iterative process. As the process terminates, each ray can return values to the ray and/or intersection points from which the rays were created. Thus, information can be passed back, combined, and passed back again until the original view ray is reached. For example, the view ray 204 propagates through the image plane 100 at a point 220, and can intersect the sphere 104 at a point 216. Based upon the intersection and the reflective properties of the sphere's surface, a reflective ray 208 is produced and propagates further into the scene. Additionally, based upon the intersection, a compositing ray 206 is produced that propagates from the eye 202 and through the intersection point 216. The surface properties of the intersection point 216 can substantially factor into the propagation of the compositing ray 206. For example, propagation of the compositing ray 206 could be ignored if the surface of the sphere 104 is substantially opaque, however, for some arrangements a compositing ray may be used regardless of surface characteristics. In some implementations, a perfectly opaque object (e.g., the sphere 104) can be represented by assigning an alpha channel value of one, however, other techniques may also be used.

In this illustration, the reflective ray 208 is cast away from the sphere 104 to collect color information to be represented in the reflection of the sphere's surface (at point 216). For example, the reflective ray 208 can intersect the plane 102 at a point 218, which can prompt the creation of a reflective ray 212 and another compositing ray 210 (for that intersection point).

Similar to the compositing ray 206, the compositing ray 210 is typically produced at the eye 202 and is cast through the point 218. Since no objects are present beyond the plane 102, the compositing ray 210 insects the back plane 214 and returns the color of the back plane (at the intersection point) for compositing with other colors associated with the point 218 (e.g., color of the surface 102 at that point, color returned by the reflected ray 212, light source information, etc.).

In this particular example, the reflective ray 212 is produced at the point 218 and cast away from the plane 102. Since no objects are present in the path of the reflective ray 218, the back plane 214 is also intersected by this reflective ray. As such, the color of the back plane 214 (where intersected by the reflective ray 212) is returned for compositing with the colors associated with point 218 of the plane's 102 reflective surface. For example, the plane 102 could relatively be more transparent compared to its reflective properties. As such, the color returned by the composting ray 210 may have a more significant impact on the composite color of the point 218 (compared to the color returned by the reflective ray 212). Thereby, the color returned by the compositing ray 210 may be more heavily weighted than the color provided by the reflective ray 212. Other scenarios can be appreciated in which other and more complex weighting methods and techniques may be implemented.

Back planes with various types of imagery and colors may be implemented, dependent upon factors such as desired final appearance, computational complexity, and/or other considerations. For example, a back plane with various images and numerous colors may be used, or a monochromatic back plane could be implemented, or a combination of both.

Upon compositing the color at point 218 from the various color information sources, the composite color can be returned back along the reflected ray 208 and used to determine the color of point 216. For example, the composite color at point 216 can be determined in a similar manner from the color returned from compositing ray 206 and the surface color at point 216, along with the color returned by reflective ray 208 and other information (e.g., lighting information). The calculated color at the point 216 can then be returned for display at point 220 on the image plane 200. Along with repeating this procedure for the other pixels associated with the image plane 200, by repeating the procedure over time, the image provided by the image plane can be updated (e.g., to simulate object motion within the scene).

Figure 3:
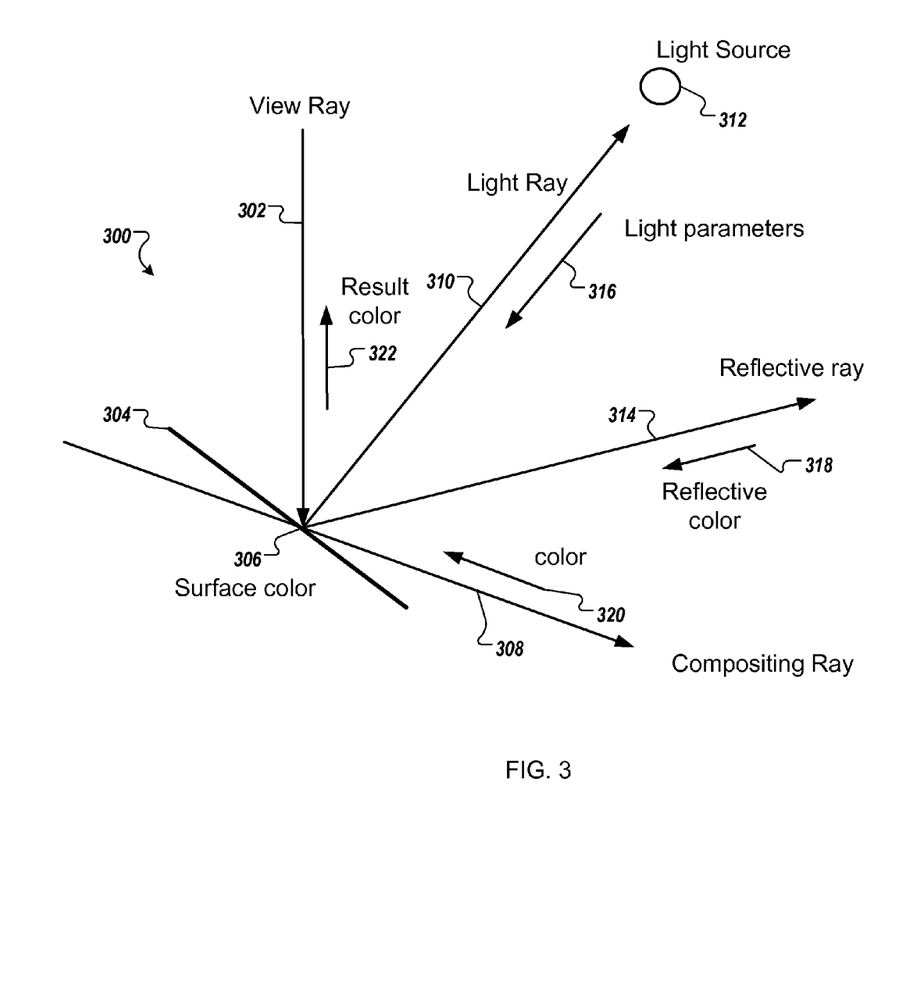
FIG. 3 illustrates a collection of rays associated with a surface intersection point.

Referring to FIG. 3, block diagram 300 illustrates various types of rays that may be associated with an intersection point and the color information provided to produce a composite color for the intersection point. For example, a view ray 302 (similar to the ray 204 of FIG. 2) can intersect with a surface 304 at a point 306, thereby initiating the production of rays to be used for determining the color of the surface 304 at the point 306. For example, a compositing ray 308 may be produced that originates at a viewing position (e.g., such as a viewing position similar to the eye 202) and propagates through the point 306 and continues away (e.g., to a back plane). Upon intersecting an object (or back plane), a color 320 is returned to the point 306. Similarly, a light ray 310 may be produced that originates at the point 306 and is cast toward a lighting source 312 of the scene. For multiple lighting sources, multiple light rays may be produced and respectively cast toward the appropriate light source. The light ray 310 can be used to gather and return light parameters 316 (e.g., light intensity, shading and shadow information, light color or wavelength, tint, etc.) for calculating the composite color at the point 306.

One or more reflective rays may also be produced based upon the geometry and reflective properties of the surface at point 306. For example, a reflective ray 314 can be produced and cast from the point 306. In some implementations, the reflective ray 314 may be cast off at an angle that is equivalent to the angle of incidence of the view ray 302. The reflective ray 314 can be used to collect and provide a reflective color 318 that may also be used for calculating the surface color at point 306. From the returned colors and the color of the plane's surface, a composite color for the point 306 may be calculated and returned as a result color 322 along the view ray 302 to a previously encountered intersection point or to an image plane (for assignment to one or more pixels). It is appreciated that some techniques may implement fewer, more, and/or different rays and/or color and imagery information.

Figure 4:
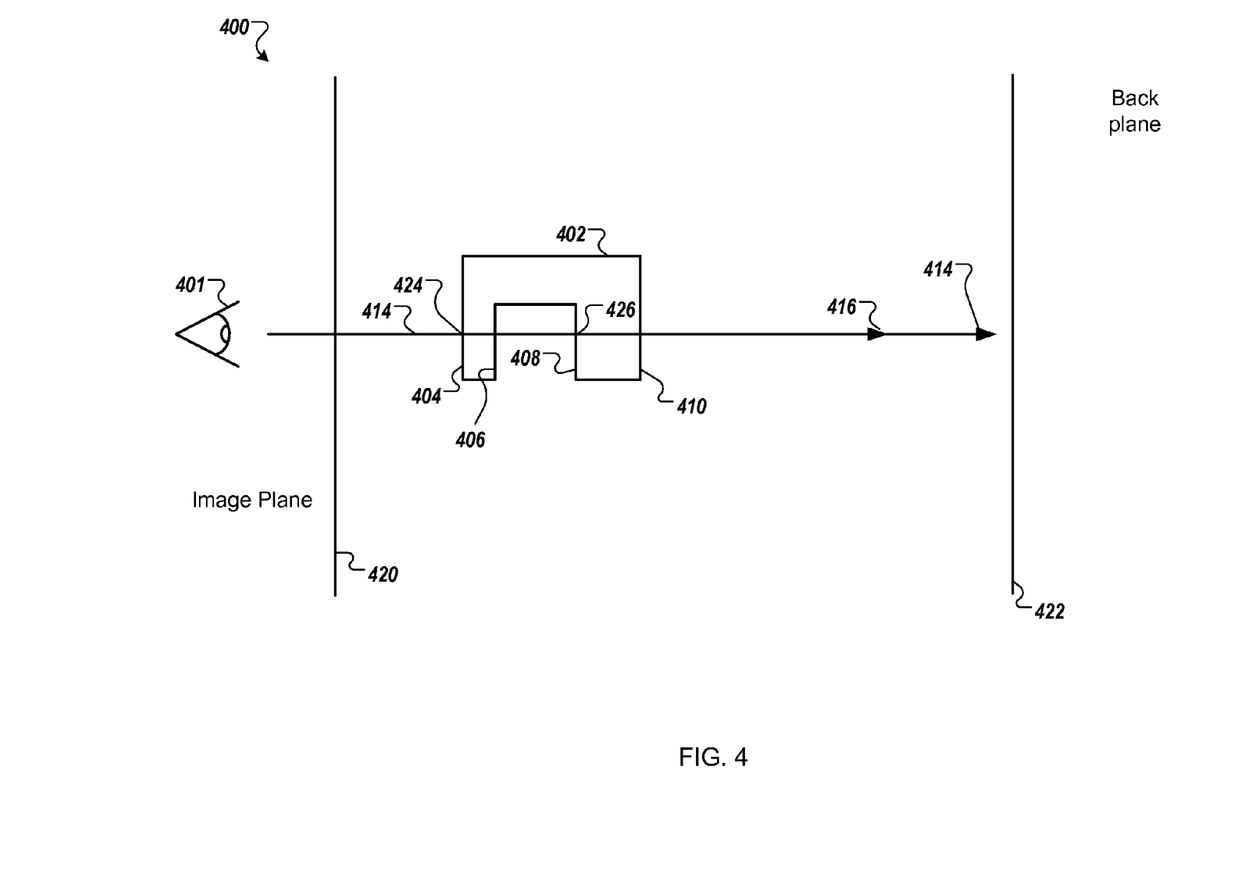
FIG. 4 illustrates rays interacting with a graphical object.

Referring to FIG. 4, another exemplary graphical scene 400 illustrates a relatively complex geometry that may be encountered by a view ray and correspondingly produced compositing ray. In some implementations, color information may be disregarded if provided from multiple intersections with a common object (so that an object does not composite with itself). Various techniques may be implemented to determine if colors are being provided based upon interactions with the same object. For example, a unique object identifier (e.g., numerical value) may be assigned to each object in a graphical scene. Based upon the assigned identifiers, compositing may be controlled to exclude color information from some or all common object surfaces. For example, if color information (from a compositing ray) from an inner surface (e.g., a back facing polygon) of an object may be disregarded while color information associated with an interaction of a compositing ray with an exterior surface may be included.

In this illustration, a unique object identifier can be assigned to an object 402 in the scene 400. When a compositing ray is created due to another ray (e.g., a view ray) intersecting the object 402, the object identifier can be associated with the compositing ray and used to appropriately identify composite colors. Similar to the illustration in FIG. 2, an eye 401 views the scene through an image plane 420. The object 402 has a relatively complex geometry is positioned such that a view ray 414 first intersects a surface 404 at a point 424. Based upon the intersection, a compositing ray 416 is produced (at the eye 402) and propagates from the intersection point 424 towards the back plane 422. In this implementation, the compositing ray 416 is associated with the object identifier of block 402 since the compositing ray was produced based upon the intersection point 424 (which is located on the block 402).

As the compositing ray 416 propagates, both inner surfaces and exterior surfaces of the block 402 are encountered. For example, inner surface 406 (which is also associated with the object identifier of the block 402) is intersected by the by the compositing ray 416. In this case, since the compositing ray 416 and the intersected object 402 share a common identifier number (and that the encountered surface is an interior surface), color information associated with this intersection is disregarded. As such, the inner surface 406 may be ignored and the compositing ray continues to the next surface intersection. In this illustration, an intersection point 426 on a surface 408 is intersected by the compositing ray 416. Surface 408 can be considered an external surface of the block 402 (e.g., the surface is a forward facing polygon). As such, color information can be collected from the intersection point 426 and passed to the image plane 420 for compositing with other color information. The compositing ray continues to propagate through the scene and may intersect with the black plane 422. Correspondingly, the compositing ray 416 also returns color information from the back plane 422 for compositing with the other returned color information.

In this example, the compositing ray 416 intersects another inner surface 410, which is treated similar to the inner surface 406 and is not used to provide color information. However, in some implementations such inner surfaces may be utilized. For example, for partially transparent or hollow objects, such surface intersections may be used to provide color information.

Figure 5:
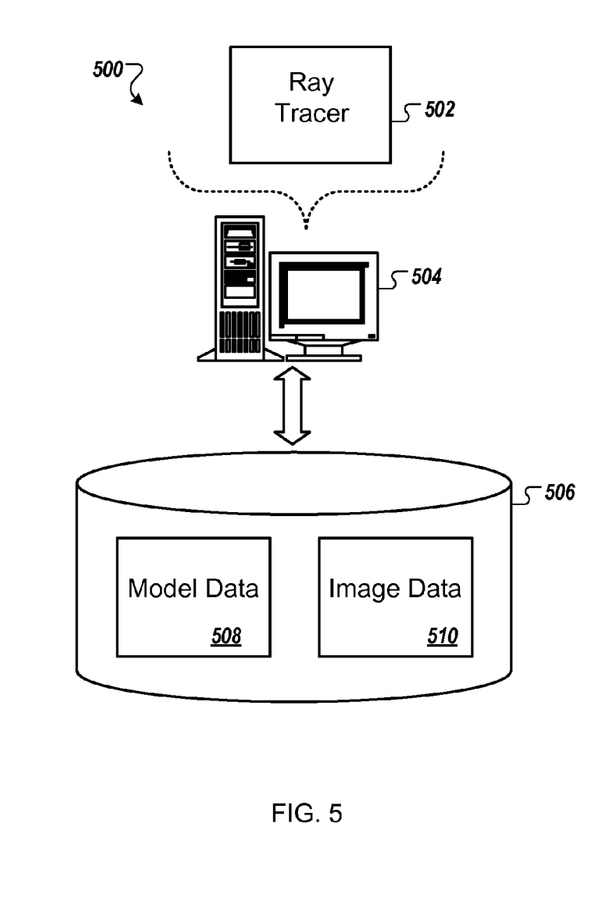
FIG. 5 illustrates an image production system.

Referring to FIG. 5, an exemplary image production system 500 includes a computer system 504 that is configured to access and store data on a storage device 506 (e.g., a hard drive, CD-ROM, etc.). A ray tracer 502 can be executed by the computer system 504 to perform calculations for rendering images 510 (e.g., 2D images) from model data 508 (e.g., 3D model data).

Along with software implementations (e.g., programs, functions, etc.) the ray tracer 502 can include, but is not restricted to, a hardware module (individually or in combination), which can render a scene into an image. In some implementations, the ray tracer 502 can be an executable program in an operating system, a collection of subsystems that may be distributed geographically or logically, and/or a module included in a software object that provides other functionality. In some examples, the ray tracer 502 can be a part of a software product that is primarily used for the compositing of images, but also provides ray tracing functionality. In some examples, the ray tracer 502 can include hardware specific functionality to utilize dedicated hardware for general or specific graphical or physical modeling operations. In some examples, the ray tracer 502 can include distributed clients working in parallel to render a scene.

A computer system 504 can be a system that can implement ray tracing functionality. In some implementations, this can include one or more desktop and/or laptop computers, one or more dedicated servers, and/or other computational systems or subsystems.

A storage device 506 can be a software and/or hardware object used to store data. In some implementations, this can include a relational database, data stored in random access memory (RAM) or on a hard disk such as, but not restricted to, a disk drive or compact disk (CD). The database 506 can include application specific data formats and/or established, well known and/or published data formats.

A model data 508 can include information about a scene to be rendered. In some implementations, this information can include a collections of polygons which can include vertex locations, color, material, alpha channel values and/or other information. In some implantations, physical information such as, but not restricted to, material names, hardness, electrical resistance or conductivity and/or density can be included in the model data 508.

An image data 510 can include information about the appearance of a scene. In some implantations, the image data can include red, blue, and green (RGB) and alpha channel data, images and/or video stored in publicly known or not publicly known image and/or video formats such as, but not restricted to, Joint Photographic Experts Group (JPEG), Audio Video Interleave (AVI), Portable Network Graphics (PNG), and/or Graphics Interchange Format (GIF) formats.

Figure 6:
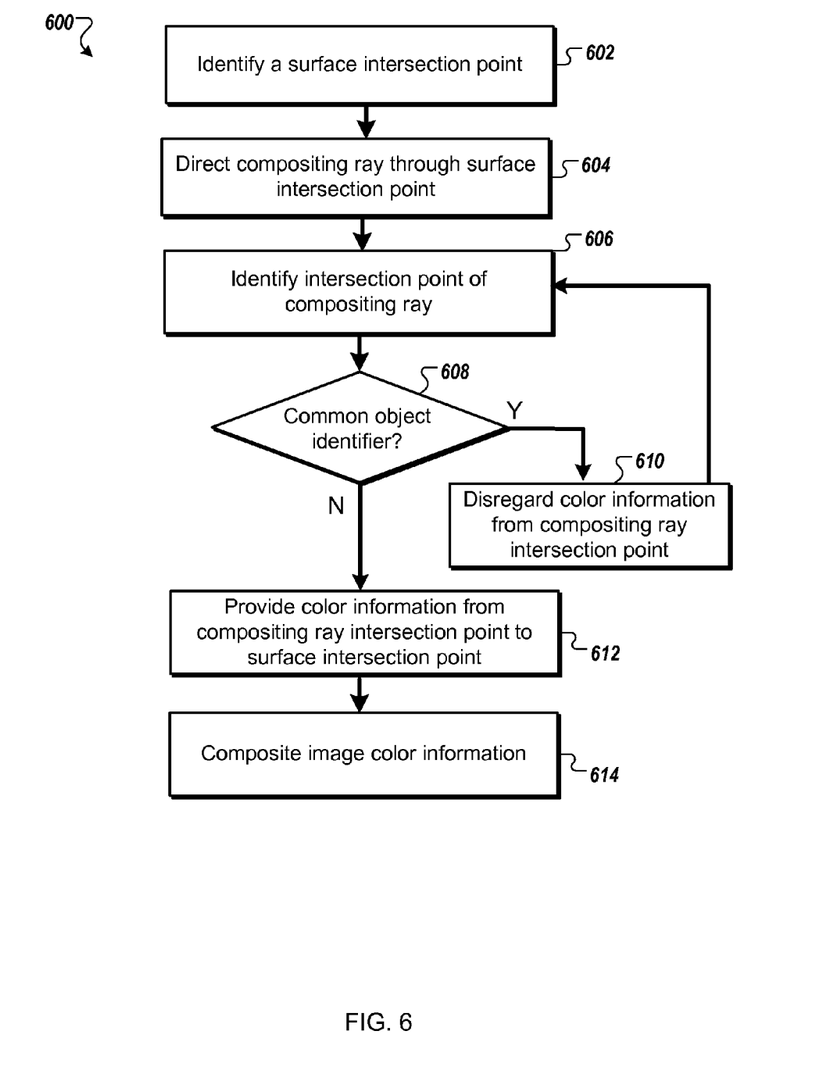
FIG. 6 is a flowchart that represents exemplary operations of a ray tracer.

Referring to FIG. 6, a flowchart 600 represents some of the operations of the ray tracer 502. Along with being executed at a single site (e.g., at one computer system), operation execution may be distributed among two or more sites (e.g., multiple computer systems).

Operations include identifying 602, by the ray tracer 502, a surface intersection point. In some implementations, the surface intersection point can be a point on a surface that intersects with a ray such as, but not restricted to, a view ray, a compositing ray, a light ray, a reflective ray and/or a transmission ray, individually or in combination.

Operations also include directing 604 a compositing ray through the surface intersection point. In some implementations, the compositing ray can originate at a viewpoint such as the viewpoint of the camera or viewer of the scene and pass through the surface intersection point. In some implementations, an identifier associated with the surface intersection point (e.g., the object that includes the intersection point) may is assigned to the compositing ray.

Operations further include identifying 606 an intersection point of the compositing ray, e.g., as the compositing ray propagates from the surface intersection point. Typically, the intersection point is located along the propagation path of the compositing ray and beyond the initially identified surface intersection point. Operations also include determining 608 if the identifier associated with the compositing ray is equivalent to the identifier of the intersection point of the compositing ray. For example, if the surface intersection point and the intersection point of the compositing ray are located on the same object, equivalent identifiers may be associated with each intersection. For example, a model of an empty bottle can have a surface reflection point on one side wall, thereby having a compositing ray cast such that it intersects the opposite side wall. Since the same identifier (i.e., the identifier for the bottle) is associated with both side wall, a common identifier is detected. For scenarios in which a common identifier is present, operations include disregarding 610 the color information associated with the intersection point of the compositing ray. For example, a compositing ray cast from one cloud surface should ignore other inner surfaces of the cloud and continue until intersecting other object beyond the cloud.

Upon disregarding the information, the ray tracer 502 returns to identify the next intersection point of the compositing ray.

Once an intersection point of the compositing ray is identified that is associated with a different identifier (e.g., an object with a different identifier), operations include providing 612 color information from compositing ray intersection point to the surface intersection point. Once provided, operations also include compositing 614 image information, for example, the color information from the compositing ray intersection point may be blended with the color information from the surface intersection point. Additional information may also be used to determine which color information to composite, for example, the type of surface intersected by the compositing ray may be used along with color information from reflected ray, transmission rays and light rays. In some arrangements, color information associated with reflected rays, transmission rays, light sources, and the surface of the intersection point may be composited to produce a shaded color. Next, the shaded color may be composited with the color information from the compositing ray. Color information associated with a back-facing polygon (e.g., an inner surface) may be disregarded while color information associated with a forward-facing polygon (e.g., an exterior surface) may be used in color composition.

Figure 7:
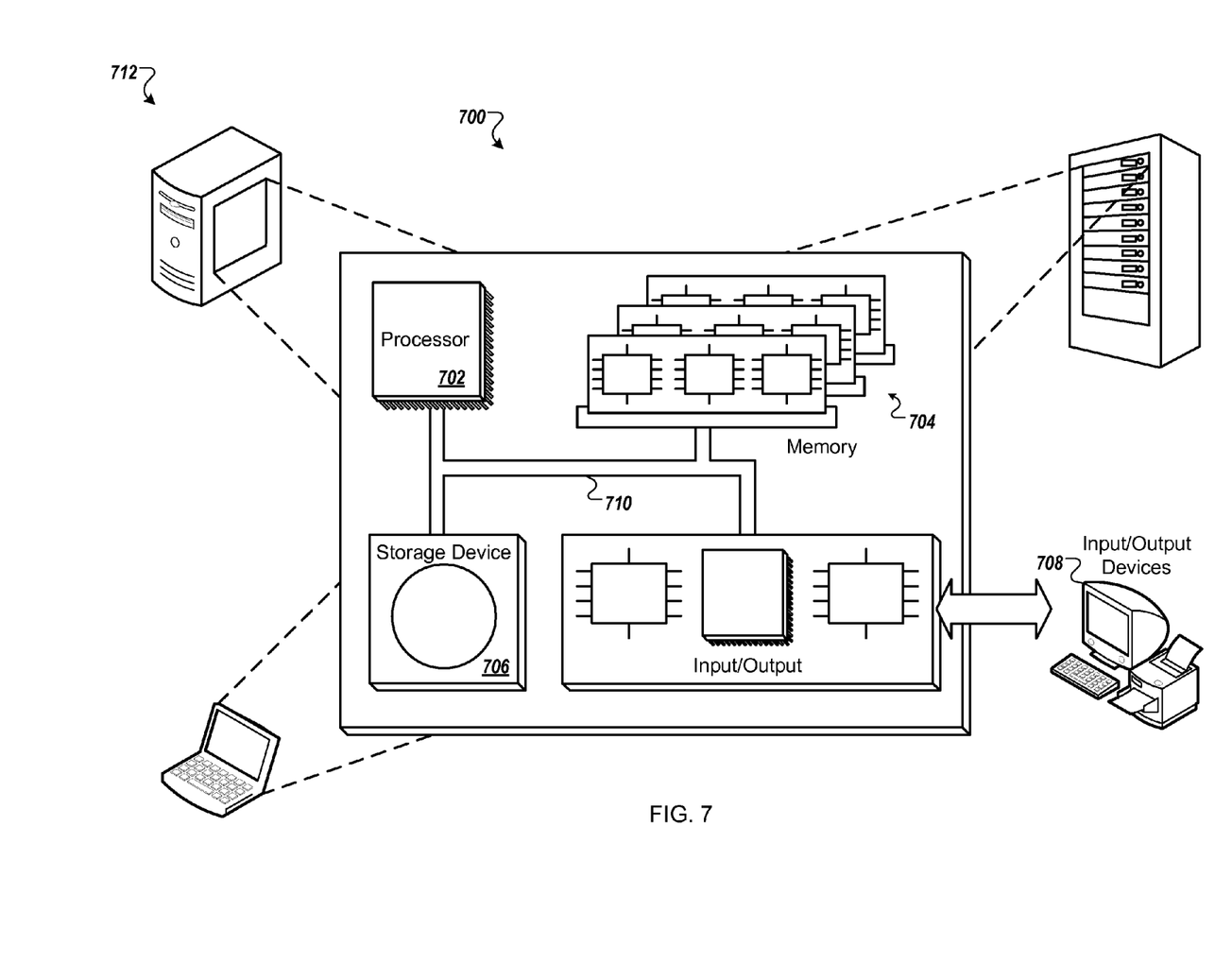
FIG. 7 is a block diagram of exemplary electronic devices.

Referring to FIG. 7, a schematic diagram of an example of a generic computer system 700 is shown. The system 700 can be used for the operations described in association with the ray tracer 502 according to one implementation. For example, the system 700 may be included in the computer system 404.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device.

In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device, that manipulates or transforms data represented as physical electronic or magnetic quantities within memories, registers, or other information storage devices, transmission devices, or display devices of the specific or special purpose computing platform.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method comprising:
   identifying an intersection point on a first graphical object from an incident ray, wherein the incident ray originates from an image viewpoint;
   independent of the incident ray, directing a compositing ray from the image viewpoint to the intersection point based on the intersection point being identified by the incident ray; and
   determining color information associated with the intersection point from color information provided by the compositing ray.

2. The computer-implemented method of claim 1, wherein determining the color information associated with the intersection point includes compositing the color information from the compositing ray and color information associated with a reflected ray.

3. The computer-implemented method of claim 1, wherein determining the color information associated with the intersection point includes compositing the color information from the compositing ray and color information associated with a surface of the first graphical object.

4. The computer-implemented method of claim 1, wherein determining the color information associated with the intersection point includes compositing the color information from the compositing ray and color information associated with a transmission ray.

5. The computer-implemented method of claim 1, wherein determining the color information associated with the intersection point includes determining a light parameter from a light source.

6. The computer-implemented method of claim 1, wherein determining the color information associated with the intersection point includes disregarding color information associated with a second graphical object.

7. The computer-implemented method of claim 6, wherein the second graphical object is the first graphical object.

8. The computer-implemented method of claim 6, wherein the second graphical object and the first graphical object share a common identifier.

9. The computer-implemented method of claim 1, wherein the image viewpoint includes a pixel of an image plane.

10. A system, comprising:
a computer system including,
a memory for storing graphical objects, and
a ray tracer for identifying an intersection point on a first graphical object from an incident ray, wherein the incident ray originates from an image viewpoint, the ray tracer is configured to, independent of the incident ray, direct a compositing ray from the image viewpoint to the intersection point based on the intersection point being identified by the incident ray, the ray tracer is further configured to determine color information associated with the intersection point from color information provided by the compositing ray.

11. The system of claim 10, wherein to determine the color information associated with the intersection point, the ray tracer is configured to composite the color information from the compositing ray and color information associated with a reflected ray.

12. The system of claim 10, wherein to determine the color information associated with the intersection point, the ray tracer is configured to composite the color information from the compositing ray and color information associated with a surface of the first graphical object.

13. The system of claim 10, wherein to determine the color information associated with the intersection point, the ray tracer is configured to composite the color information from the compositing ray and color information associated with a transmission ray.

14. The system of claim 10, wherein to determine the color information associated with the intersection point, the ray tracer is configured to determine a light parameter from a light source.

15. The system of claim 10, wherein to determine the color information associated with the intersection point, the ray tracer is configured to disregard color information associated with a second graphical object.

16. The system of claim 15, the second graphical object is the first graphical object.

17. The system of claim 15, wherein the second graphical object and the first graphical object share a common identifier.

18. The system of claim 10, wherein the image viewpoint includes a pixel of an image plane.

19. A computer program product, encoded on a computer-readable storage device, operable to cause data processing apparatus to perform operations comprising:
identifying an intersection point on a first graphical object from an incident ray, wherein the incident ray originates from an image viewpoint;
independent of the incident ray, directing a compositing ray from the image viewpoint to the intersection point based on the intersection point being identified by the incident ray; and
determining color information associated with the intersection point from color information provided by the compositing ray.

20. The computer program product of claim 19, wherein determining the color information associated with the intersection point includes compositing the color information from the compositing ray and color information associated with a reflected ray.

21. The computer program product of claim 19, wherein to determine the color information associated with the intersection point, the ray tracer is configured to composite the color information from the compositing ray and color information associated with a surface of the first graphical object.

22. The computer program product of claim 19, wherein determining the color information associated with the intersection point includes compositing the color information from the compositing ray and color information associated with a surface of the first graphical object.

23. The computer program product of claim 19, wherein determining the color information associated with the intersection point includes determining a light parameter from a light source.

24. The computer program product of claim 19, wherein determining the color information associated with the intersection point includes disregarding color information associated with a second graphical object.

25. The computer program product of claim 24, wherein the second graphical object is the first graphical object.

26. The computer program product of claim 24, wherein the second graphical object and the first graphical object share a common identifier.

27. The computer program product of claim 19, wherein the image viewpoint includes a pixel of an image plane.

28. A method comprising:
executing instructions on a computing platform so that digital electronics signals representing an intersection point on a first graphical object are identified from an incident ray, wherein the incident ray originates from an image viewpoint;
executing instructions on the computing platform so that digital electronics signals representing a compositing ray, independent of the incident ray, are directed from the image viewpoint to the intersection point based on the intersection point being identified by the incident ray; and
executing instructions on the computing platform so that digital electronics signals representing color information associated with the intersection point are determined from color information provided by the compositing ray.

* * * * *